Figure 4:
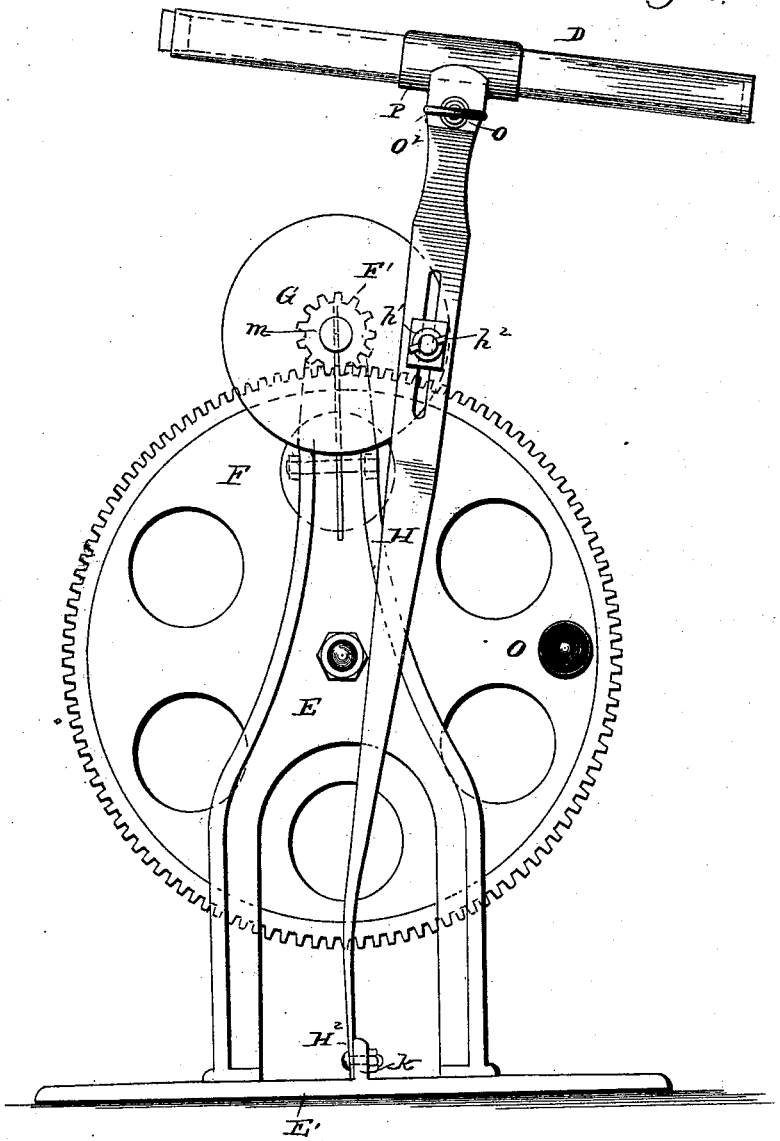

(No Model.) 3 Sheets—Sheet 1.
B. KANABLE.
OIL PROCESS IN BUTTER MAKING.
No. 400,219. Patented Mar. 26, 1889.
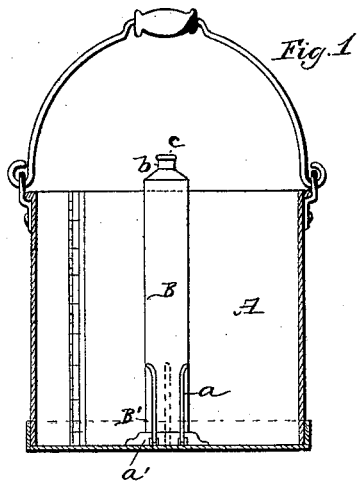
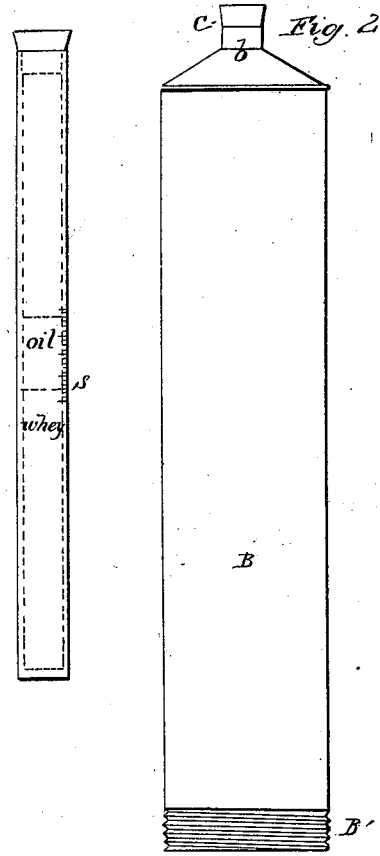
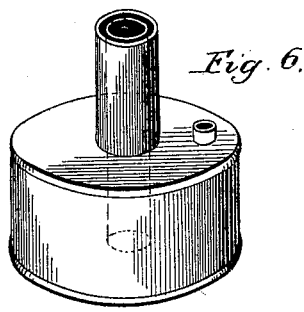
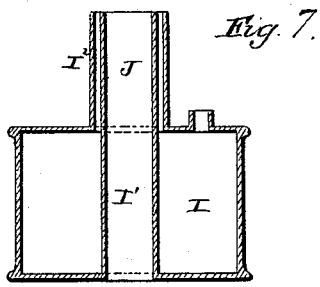
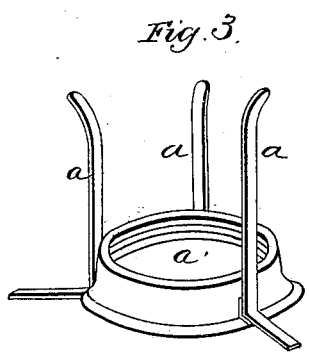
Witnesses.
G. F. Downing
R. S. Ferguson
Inventor.
Byron Kanable
By his Attorneys
Leggett & Leggett (No Model.) 3 Sheets—Sheet 3.

B. KANABLE.
OIL PROCESS IN BUTTER MAKING.

No. 400,219. Patented Mar. 26, 1889.

Witnesses
G. F. Downing
R. S. Ferguson

Inventor
Byron Kanable
By his Attorneys
Seggett and Seggett

UNITED STATES PATENT OFFICE.

BYRON KANABLE, OF MARION, OHIO.

OIL PROCESS IN BUTTER-MAKING.

SPECIFICATION forming part of Letters Patent No. 400,219, dated March 26, 1889.

Application filed March 21, 1888. Serial No. 267,989. (No model.)

*To all whom it may concern:*

Be it known that I, BYRON KANABLE, of Marion, in the county of Marion and State of Ohio, have invented certain new and useful Improvements in Oil Processes in Butter-Making; and I do hereby declare the following to be a full, clear, and exact description of the invention, such as will enable others skilled in the art to which it appertains to make and use the same.

My invention relates to an improved process for determining the amount of butyric oil contained in a given quantity of milk or cream to afford a means of computing its market value in the production of butter therefrom.

In the manufacture of pure butter from cream it is well known to those skilled in the art that there is considerable variation in the butter-making qualities of cream drawn from different cattle. This is principally due to the breed of the animal, but may also result from quality and methods of feeding. Of late in parts of the country where proper facilities exist for the industry, butter-making processes have been developed to a science and improved machinery has been brought into service to economically and rapidly convert cream into butter. Where it is found profitable to do so, a consolidation of farmers' interests is effected to work their joint product of cream into butter by the improved processes and machinery mentioned. Such a plant of machinery is termed a "creamery," and is operated by skilled labor in the art to reliably produce good butter in large quantities from the general contributions of cream of the stockholders, and the butter produced is either divided pro rata or sold and the proceeds accredited to the joint owners in proportion to the market value and quality of the cream each party furnishes. More generally the creamery plant is owned by individuals who operate it as a commercial enterprise and collect or receive cream from producers in the near surrounding country, paying for the cream in proportion to its value, as its butter production per gallon or pound is large or small. Whether the creamery plant is operated jointly by milk-producers or as an individual enterprise, owing to the variations in richness of the cream, it is necessary to provide some reliable means for determining the value of the cream, which is proportionate to the amount of oil it contains, it being well known that the main constituent elements of cream consist of butyric oil, caseous matter, and whey in varying proportions. Heretofore it has been customary to retain samples consisting of a fixed quantity of the cream and watery as well as cheesy elements which are contained in each cream-furnisher's "pail" that represents a certain number of pounds or quarts of cream when filled. These samples are put separately and successively into a test glass or tube, which is of a certain known dimension as compared to the cream-pail just mention, and by an agitation, manually or otherwise, of the test-tube the contents are churned, as it were, to separate the butyric oil from the whey and caseine. After a continued agitation has effected the desired separation of the oil-globules the test-tube, which has been corked during the operation, is opened and vertically immersed, with the sealed lower end downward, in a vessel of hot water, which will cause the oil to rise to the top of the test-tube, it being the lightest of the three elements mentioned, the caseine and whey, being heavier, settle to the lower part of the tube. A creamery "inch," or one inch in depth of the butyric oil, represents a certain amount or weight of oil to a pound or quart of the cream in a milk-producer's "pail;" and any proportionate fraction of the inch shown on a graduated test-tube, or scale applied to this test-tube, will indicate the relative richness of the cream, and its value may thus be readily computed. In conducting the operation of testing the cream by methods in use previous to the invention in my improved process an uncertainty as to accuracy and reliability prevailed, and dissatisfaction to the seller as well as buyer sometimes occurred. It being necessary to conduct the testing-operation at the creamery, and not in the presence of the producer, who was an interested party, disputes as to actual value were liable to take place. To overcome these well-known defects in the system of testing the commercial value of cream disposed of to the creamery owners, by furnishing a more accurate and reliable means for determining rapidly and with precision the exact amount of oil contained in a certain quantity or "sample" of the contents of a "creamery-pail," and thus afford a ready means for arriving at the true commercial value of the cream of a producer, I have devised a novel process, and also complete apparatus to carry the same into effect, which I will proceed to describe.

With these intents in view my invention comprises a new process, the first step of which consists in procuring a sample of the contents of each creamery-pail; next, inserting a predetermined quantity in a transparent test-tube that may be graduated near its upper end and is a unit of measure or weight of the contents of a creamery-pail when it is filled with cream, then placing the test-tube in a novel churning device, by which it is properly and rapidly agitated, and, finally, heating the churned contents of the test-tube by its insertion within a preferably circular flame which is evolved in a novel lamp. By these distinct steps the oil contained in the contents of the test-tube will speedily be converted into globules and rise to the upper portion of the test-tube. Now by a proper manipulation of the tube in the lamp-flame all the water held in suspension in the oil will be driven off as steam and the exact amount of oil contained in the tube will be shown perfectly separated from the other elements, thus affording an accurate unit of measure to determine the commercial value of the contents of a creamery-pail filled with a producers's cream.

The drawings herein shown represent the preferred form of apparatus I employ to carry into effect my improved process, whereby to determine the amount of oil contained in a producer's creamery-pail of cream. The mechanism is so devised as to be light and portable, readily operated, and which will afford means for the conducting of the testing-operation by a "routeman" or cream-gatherer at the residences of cream-producers, so that each interested party may see plainly and reliably demonstrated the actual commercial value of their product before the removal from the creamery-pail of its entire contents.

Figure 5:
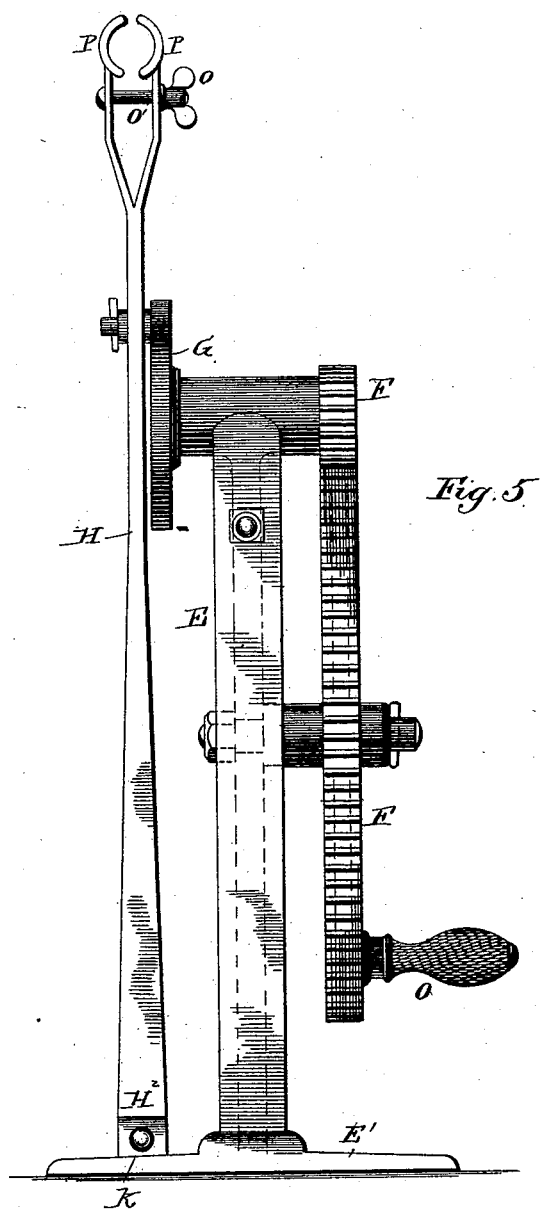

Referring to the drawings specifically, Figure 1 represents a side elevation in section of a creamery-pail with sample-extractor in position therein. Fig. 2 is an enlarged side view, in perspective, of the sample-extracting tube, and Fig. 3 is a view in perspective of the detachable base of the sample-extracting tube shown in Fig. 2. Fig. 4 is a side elevation of a reciprocating churn that is adapted to convert test samples of cream into butter and residuums. Fig. 5 is an end elevation of the churn shown in Fig. 4. Fig. 6 is a view in perspective of a lamp used to convert the churned cream into butyric oil. Fig. 7 is an elevation in section of the lamp shown in Fig. 6. Fig. 8 represents the test-tube, in which a proportionate amount of the contents drawn from the creamery-pail is held sealed and churned to determine the percentage of butyric oil contained in it; the same of cream operated upon.

As the different devices which coact to carry out the successive steps of my improved process are to be more specifically described in their proper divisional order preparatory to the securing of separate patents on their mechanical construction, it will not be necessary to minutely detail their features of construction in this specification. A sufficiently complete description will, however, be given to clearly explain their general construction and methods of operation, whereby the process which is the subject of this invention may be properly carried into effect.

In Fig. 1, A represents a creamery-pail, which is made portable and of proper capacity that is known. Within the pail A, preferably at its center, a tubular receptacle, B, is erected, which is of known dimensions and preferably made of light unoxidizable sheet metal. It is intended that the tubular receptacle B shall be removable, and therefore its bottom is made detachable by the threaded engagement of the lower end, B', of its tubular wall with the similarly-threaded bottom $a'$. (Shown separated in Figs. 2 and 3.)

The lower end, B', is adapted to engage the separated bottom by the guiding-fingers $a$, which project upwardly from the bottom $a'$, which latter is secured to the inner surface of the bottom of the pail A. The top of the tubular receptacle B is contracted to join a ferrule, $b$, that may receive a cork, $c$. When the creamery-pail A is filled by a cream-producer or dairyman, ready for collection by a routeman, the fingers $a$ only are properly secured in the bottom of the pail, so as to save a number of parts. The pails are each fitted with a separated bottom of the tubular sample-extractor, the threaded portions of which will properly attach to one sample-extractor B, that is inserted with its open lower end in the full contents of a pail downward until it is guided into contact with a bottom piece that has been detachably held in place by an interlocked engagement with the fingers, as before intimated. The shell B is now screwed fast to the bottom, and the sealed sample-extractor is disconnected from the fingers $a$ and withdrawn from the pail. This is the first step in the process, and it secures a sample of the contents of the creamery-pail by removal undisturbed of the strata of rich and poor constituents of the contained cream, as it is well known that the rich oily matter will rise to the surface, while the more watery portions and caseine, which are heavier, will be nearer the bottom of the vessel. When the sample-extractor B is removed from a creamery-pail, the liquid it contains is shaken up to render it homogeneous; then a portion is decanted from the upper end, $b$, into a test-tube, D. (Shown in Fig. 8.) The tube D, which is such as has been heretofore employed for the purpose, is made of glass, and is of a certain holding capacity that is proportioned to that of the creamery-pail A, so that when a certain amount of the shaken liquid is poured into the tube up to a line, S, (marked on its side,) this quantity will have a fixed ratio to the total capacity of the creamery-pail A.

In order to ascertain quickly the exact quantity of butyric oil there is held in suspension in the contents of the test-tube D, it must be churned or quickly agitated. A preferred form of agitator or churning device is shown in Figs. 4 and 5, which consists in a vertical frame, E, provided with a base-plate, E'. On the side of the frame E a gear-wheel, F, is revolubly supported that may be revolved by a handle, O.

Upon the upper end of the frame E a shaft, $m$, is adapted to revolve by engagement of a pinion, F', which is fixed to one end of the shaft and engages the gear-wheel F.

Upon the base-plate E' the vertical spring-bar H is secured by an attachment of its lower end, $H^2$, with the flange $k$, formed on the base-plate.

The body of the spring-bar H is slotted to receive a sliding block, $h^2$, which is loosely mounted on a crank-pin, $h'$, that projects from the adjacent face of the crank-disk G, which is mouted on and secured to the other end of the horizontal shaft $m$. At the upper end of the spring-bar H a pair of spring-jaws, P P, are secured or are formed integral with the bar. These jaws are provided with curved upper ends that conform in shape to the body of the test-tube D, so as to adapt them to embrace the same near its center, as shown in Fig. 4. A clamping-bolt, $o$, and its nut $o^2$, which engage the sides of the jaws P, through which the bolt $o$ is inserted, hold the tube D securely in connection with the upper end of the spring-bar H, so that a revolution of the wheel F will communicate a rapid reciprocatory motion to the tube D and violently agitate its contents, which will liberate the oil from the caseine and whey by the mechanical action just described.

It is now necessary to cause the butyric oil which has been released from the sacs that held it by the violent impingement of the same against the sides of the test-tube during the churning operation to rise to the top of the tube. Heat is required to effect this separation. Heretofore hot water has been used for this purpose; but to rapidly separate the oil from the whey and drive off the latter in the form of steam it has been found that hot water is inadequate as a heating medium.

To effectually and speedily drive the oil to the top of the test-tube, I employ a novel form of lamp. (Shown in Figs. 6 and 7.) This consists of a metal chamber, I, which is of a proper capacity to hold the burning-fluid. Preferably alcohol is used.

There is a central cylindrical wall, I', secured to the bottom head of the chamber, so as to form a passage through the lamp-body I. Upon the upper side a larger tube, $I^2$, is affixed concentric to an inner tube, J, which latter is an extension of the cylindrical wall I'.

Between the two tubes I J an annular passage is formed that is open into the chamber I at its lower end, and is intended to receive a wick, and thus afford a circular flame when the wick is lighted.

The relative diameters of the test-tube D and the lamp-tube J are such that the test-tube may be inserted at the bottom of the lamp and moved freely up and down through the tube J, so as to expose it to the heat of the annular flame of the lamp without danger of breakage, as this flame must not be too close to the outer surface of the tube when it is inserted, as above stated. After the liquid in the test-tube D has been churned sufficiently, which will take but a few minutes, said tube is removed from the clamp-jaws P P and inserted through the tube J of the lighted lamp I and moved up and down to thoroughly heat the contents. This will expand the oil and cause it to rise at once to the top of the liquid. When it is considered that the butyric oil has been thoroughly dissociated from the caseine and whey, the tube is immersed in cold water up to the lower surface of the oil. The tube is now again inserted through the lamp-tube J, but is only heated at the portion that contains the oil. This will vaporize and drive off all water that may pervade the oil without generating steam below the butyric oil, it being understood that the stopple $c$ has been removed from the test-tube D when it is being exposed to the heat of the lamp.

The graduated surface of the tube, which may be in any fractional parts of an inch preferred, will now indicate the exact amount of butyric oil contained in the cream held by the test-tube, and as has been before explained, or a separate scale may be used to test the amount of oil. The exact ratio of oil to volumes of whey and caseine will thus be indicated with respect to the contents of a filled creamery-pail, so that its actual butter-making value will be thus determined to the satisfaction of the producer and purchaser.

I do not wish to limit myself to the exact forms of mechanism herein shown to carry into effect my improved process or any of its several steps, as it is apparent that these may be varied and still obtain measurably good results; hence I reserve the right to embody other devices to effect the several steps of my process that are adequate to accomplish them with speed and certainty.

The several devices herein described form the subject-matter of applications, Serial No. 268,241, filed March 23, 1888, and Serial No. 268,316, filed March 23, 1888.

Having fully explained my process for the determination of the exact amount of oil contained in a sample of cream, and shown and described one preferred means for carrying the same into practice, what I claim as new, and desire to secure by Letters Patent, is—

1. A process for determining the exact amount of oil contained in a sample of cream, consisting of the withdrawal of a sample taken vertically through the contents of the creamery-pail or other gaged vessel, then decanting the mixed contents of the extractor, then churning the cream, and finally exposing the churned cream to the heat of a flame the temperature of which is sufficiently high to drive off the water held in suspension by the oil, substantially as set forth.

2. The process for determining accurately the amount of oil contained in a quantity of cream, consisting, essentially, in securing a sample vertically through the contents of a cream-pail, churning the sample, and finally exposing the churned sample to the action of a degree of heat sufficient to drive off the water contained in the oil, substantially as set forth.

3. The process for determining the amount of oil contained in a quantity of cream, consisting in taking a sample vertically through the contents of a cream-pail, churning the same, exposing the cream sample to the action of a degree of heat sufficient to drive the oil to the top, and finally expelling the water therefrom, substantially as set forth.

In testimony whereof I have signed this specification in the presence of two subscribing witnesses.

BYRON KANABLE.

Witnesses:
H. P. COPELAND,
JAMES CULBERTSON.